Nov. 28, 1939.  W. S. FORBES  2,181,399
RETURNABLE UTILITY CABINET
Filed April 24, 1939
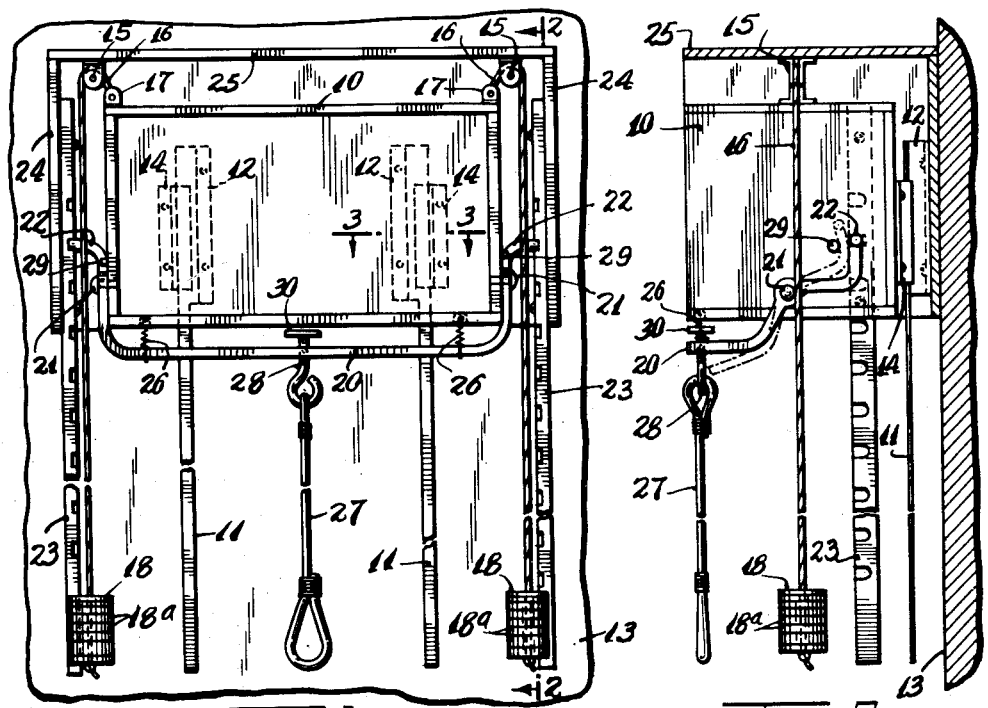
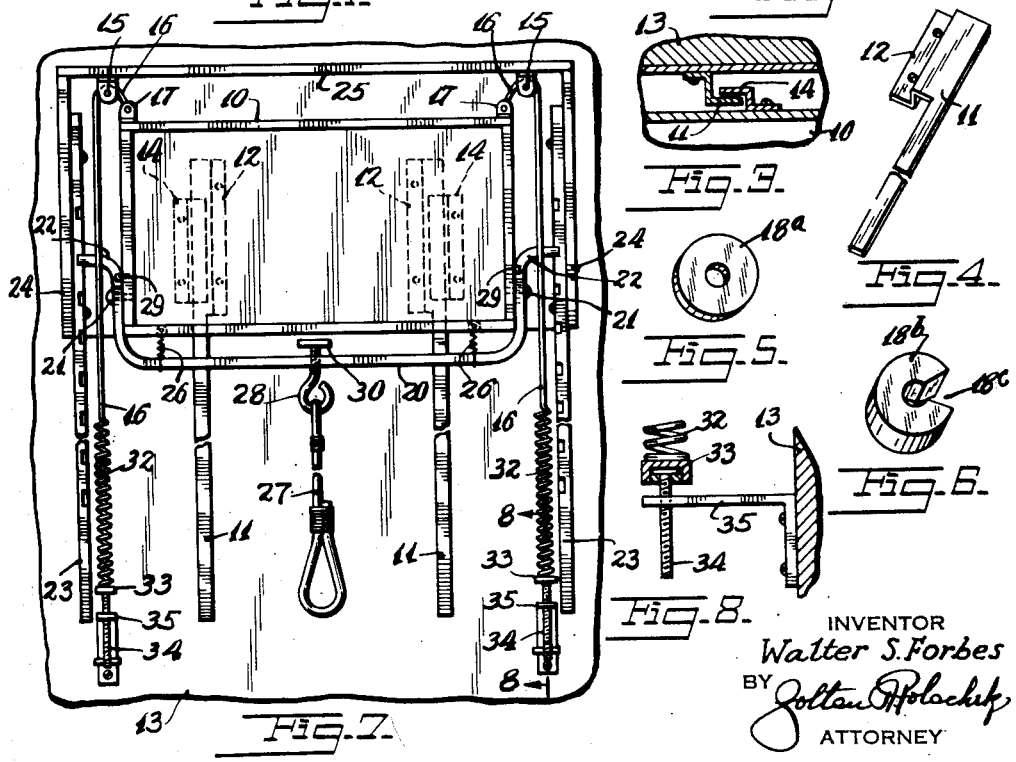
INVENTOR
Walter S. Forbes
BY
ATTORNEY Patented Nov. 28, 1939

2,181,399

UNITED STATES PATENT OFFICE 2,181,399

RETURNABLE UTILITY CABINET

Walter S. Forbes, Staten Island, N. Y.

Application April 24, 1939, Serial No. 269,588

6 Claims. (Cl. 312—32)

This invention relates to new and useful improvements in a returnable utility cabinet.

The invention has for an object the provision of a means in conjunction with a utility cabinet adapted to return the cabinet to a predetermined position after it is used.

More specifically, the invention proposes to characterize the cabinet by a container adapted to hold different wares.

Still further the invention contemplates the use of counterweights or springs to normally urge the cabinet back into a predetermined position.

The invention also proposes a novel means for holding the cabinet lowered when required.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a front elevational view of a returnable utility cabinet constructed according to this invention.

Fig. 2 is a vertical sectional view taken on the line 2—2 of Fig. 1.

Fig. 3 is a fragmentary horizontal sectional view taken on the line 3—3 of Fig. 1.

Fig. 4 is a perspective view of one of the rails used in guiding the cabinet.

Fig. 5 is a perspective view of one of the counterweights.

Fig. 6 is a perspective view of an auxiliary counterweight which may be added to supplement the other counterweights.

Fig. 7 is a front elevational view similar to Fig. 1 but illustrating a utility cabinet constructed according to a modification of this invention.

Fig. 8 is a fragmentary sectional view taken on the line 8—8 of Fig. 7.

The returnable utility cabinet, according to this invention, includes a cabinet or container 10 and means for guiding said cabinet in upward and downward movements. This guiding means includes a pair of rails 11 having flange portions 12 by which the rails are mounted upon a wall 13. The cabinet 10 is located to the front of this wall. A pair of flanges 14 is mounted upon the rear of the cabinet 10 and interengages the rails 11 for guiding the cabinet 10 to move vertically upwards and downwards.

A means is provided for urging the cabinet 10 into a normally raised position. This means includes a pair of pulleys 15 stationarily mounted above the cabinet 10 and supporting cables 16 which extend over the pulleys. One of the ends of these cables connects with lugs 17 mounted upon the top of the cabinet 10 at the ends thereof, and preferably at the central area. The other ends of the cables 16 support counterweights 18 which are adapted to normally urge the cabinet 10 into a raised position. Each counterweight 18 is composed of a plurality of small weights 18ª stacked one above the other and having a total weight capable of counter-balancing the utility cabinet 10 when it is empty. When the cabinet 10 is filled with wares it is necessary that auxiliary weights be added to supplement the weights 18. Such auxiliary weights comprise weights 18ᵇ similar to that shown in Fig. 6. These weights 18ᵇ have open sides 18ᶜ so that they may be slipped on and removed from the cables 16 as required.

A yoke 20 extends transversely across the bottom of the cabinet 10 and at its sides is pivotally mounted by pintles 21 to the sides of the cabinet 10. The yoke 20 has above these pivots 21, finger portions 22 which are adapted to engage the teeth of racks 23 stationarily mounted upon partitions 24. These partitions are connected with the top wall 25. The pulleys 15 are also mounted on this top wall 25.

Resilient means are provided for urging the yoke 20 in a direction in which the fingers 22 engage the racks 23. These resilient means comprise tension springs 26 which are connected between the yoke 20 and the cabinet 10 and serve to normally draw the yoke 20 upwards pivoting the same so that the fingers 22 move rearwards and engage the racks 23.

A cable 27 is connected with the yoke 20 and is adapted to pivot the yoke to a position in which the fingers 22 are free of the racks so that the cabinet may be pulled down by pulling the cable. More specifically, the upper end of the cable 27 connects with a bolt 28 which is threadedly mounted on the yoke 20. When the cable 27 is pulled the yoke 20 will be pivoted. Pins 29 are mounted on the ends of the cabinet 10 in the path of motion of the fingers 22 to limit forward motion of these fingers to positions in which they are free from the racks 23.

A means is provided operable by twisting the cable 27 for holding the yoke 20 in its position in which the fingers 22 are free. This means includes the bolt 28 and an abutment element 30 which is mounted upon the upper end of the bolt. The bolt 28 engages completely through the yoke 20. The abutment element 30 is adapted to engage the bottom of the utility cabinet 10 to hold the yoke 20 downwards, in which position the fingers 22 are out of engagement with the rack 23.

In Figs. 7 and 8 a modified form of the invention has been disclosed which distinguishes from the prior form merely in the construction of the means for urging the cabinet 10 into its upward position. In this form of the invention, in place of the counterweights there are springs. More specifically, the cables 16 connect with springs 32 which are provided with turnable sockets 33 at their bottom ends. These sockets 33 connect with threaded members 34 threadedly engaging through stationary brackets 35. When the threaded members 34 are turned in one direction the springs 32 will be slackened. When turned in the other direction they will be tensioned. In this manner a suitable force may be obtained for returning the utility cabinet 10 into its raised position when it is full, as well as when it is empty.

The operation of the device is as follows:

When it is desired to place wares in the utility cabinet 10 the cable 27 is gripped and pulled. This first causes the yoke 20 to pivot so that the fingers 22 are disengaged from the racks 23. Further movement downwards of the cable 27 causes the utility cabinet 10 to be pulled down. In its lowered position the utility cabinet may be maintained stationary by immediately releasing the cable 27 which permits the springs 26 to pivot the yoke 20 so that the fingers 22 engage the racks 23.

If it is desired that the utility cabinet be returned to its upper position it is necessary that the cable 27 be pulled to disengage the fingers 22 from the racks 23. Then while there is still tension on the cable 27 it is let out so that it moves frictionally through one's hands. This produces sufficient tension to maintain the fingers 22 out of contact with the racks 23, while the cabinet 10 itself moves upwards due to the means for normally urging the cabinet upwards.

If it is desired that the cabinet automatically return to its upward position each time the cable 27 is released, it is merely necessary that the cable 27 be twisted to cause the bolt 28 to screw upwards so that the abutment 30 engages the bottom of the utility cabinet 10 and continuously holds the fingers 22 out of engagement with the racks 23. Now the cabinet may be drawn downwards, and when the cable 27 is released it will automatically move upwards.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A utility cabinet comprising a container, means for guiding said container in upward and downward motion, means for urging said container upwards, stationary racks extending along the path of motion of said container, a yoke pivotally mounted on said container and having fingers engageable with said racks for holding the container in fixed positions, resilient means urging said yoke in a direction in which said fingers engage said racks, and a cable connected with said yoke to pivot the yoke to a position in which said fingers are free of the racks so that the container may be pulled down by pulling said cable.

2. A utility cabinet comprising a container, means for guiding said container in upward and downward motion, means for urging said container upwards, stationary racks extending along the path of motion of said container, a yoke pivotally mounted on said container and having fingers engageable with said racks for holding the container in fixed positions, resilient means urging said yoke in a direction in which said fingers engage said racks, and a cable connected with said yoke to pivot the yoke to a position in which said fingers are free of the racks so that the container may be pulled down by pulling said cable, said resilient means comprising springs acting between said yoke and said container.

3. A utility cabinet comprising a container, means for guiding said container in upward and downward motion, means for urging said container upwards, stationary racks extending along the path of motion of said container, a yoke pivotally mounted on said container and having fingers engageable with said racks for holding the container in fixed positions, resilient means urging said yoke in a direction in which said fingers engage said racks, a cable connected with said yoke to pivot the yoke to a position in which said fingers are free of the racks so that the container may be pulled down by pulling said cable, and pins mounted upon said container and limiting motion of said fingers to certain distances away from the racks.

4. A utility cabinet comprising a container, means for guiding said container in upward and downward motion, means for urging said container upwards, stationary racks extending along the path of motion of said container, a yoke pivotally mounted on said container and having fingers engageable with said racks for holding the container in fixed positions, resilient means urging said yoke in a direction in which said fingers engage said racks, and a cable connected with said yoke to pivot the yoke to a position in which said fingers are free of the racks so that the container may be pulled down by pulling said cable, said means for urging said container upwards including cables connected with the container and supporting counterweights.

5. A utility cabinet comprising a container, means for guiding said container in upward and downward motion, means for urging said container upwards, stationary racks extending along the path of motion of said container, a yoke pivotally mounted on said container and having fingers engageable with said racks for holding the container in fixed positions, resilient means urging said yoke in a direction in which said fingers engage said racks, a cable connected with said yoke to pivot the yoke to a position in which said fingers are free of the racks so that the container may be pulled down by pulling said cable, and means operable by twisting said cable for holding the yoke in its position in which said fingers are free.

6. A utility cabinet comprising a container, means for guiding said container in upward and downward motion, means for urging said container upwards, stationary racks extending along the path of motion of said container, a yoke pivotally mounted on said container and having fingers engageable with said racks for holding the container in fixed positions, resilient means urging said yoke in a direction in which said fingers engage said racks, a cable and means operable by twisting said cable for holding the yoke in its position in which said fingers are free of said racks so that said container may be pulled down by pulling said cable, comprising a bolt threadedly engaged through said yoke and having an abutment in a certain turned position thereof engaging against said container and holding said yoke pivoted and said fingers disengaged from the racks, and said cable being connected with said bolt to turn the bolt if the cable is twisted.

WALTER S. FORBES.